United States Patent [19]
Bryan

[11] Patent Number: 5,271,053
[45] Date of Patent: Dec. 14, 1993

[54] HOLDDOWN LEAF SPRING ASSEMBLY

[75] Inventor: William J. Bryan, Granby, Conn.

[73] Assignee: Combustion Engineering, Inc., Windsor, Conn.

[21] Appl. No.: 907,900

[22] Filed: Jul. 2, 1992

[51] Int. Cl.⁵ .............................................. G21C 3/32
[52] U.S. Cl. .................................................. 376/364
[58] Field of Search ............... 376/364, 362, 434, 285, 376/448

[56] References Cited

U.S. PATENT DOCUMENTS

| | | | |
|---|---|---|---|
| 4,072,562 | 2/1978 | Sankovich | 376/364 |
| 4,792,429 | 12/1988 | Hatfield | 376/448 |
| 5,053,191 | 10/1991 | Bryan et al. | 376/364 |
| 5,180,549 | 1/1993 | Sparrow et al. | 376/364 |

Primary Examiner—Daniel D. Wasil
Attorney, Agent, or Firm—John H. Mulholland

[57] ABSTRACT

A holddown leaf spring for a nuclear fuel assembly (10) with an upper end fitting (12) having spring retaining slots (30). Two spring stacks (20, 24 and 22, 26), respectively, are made up of unitary elongated metal bar springs having two substantially tapered width leg portions (20a, 20b, etc.) joined by an arcuate transition portion (28) therebetween. The wider opposite end portions (20c, 20d, etc.) are received in slots (30) of end fitting (12) and retained by welded pins (or capped screws) (not shown). The tapered width distributes localized stresses and may be horizontal or vertical. Less chance of debris exists due to retained spring ends. Flow at two opposite corners is opened up by the taper and by transition portion (28) being spaced from the nozzle openings (32 and 34). The assembly requires fewer parts and less machining.

7 Claims, 2 Drawing Sheets

HOLDDOWN LEAF SPRING ASSEMBLY

FIELD OF THE INVENTION

This invention relates to nuclear rector fuel assemblies and in particular those assemblies which include spaced fuel rod support grids mounted in a reactor core as a unit. The fuel rods are held between an upper end fitting or top nozzle and a lower end fitting by means of spacer grids. The reactor coolant flows upwardly from holes in the lower end fitting along the fuel rods, and upwardly through holes in the upper end fitting.

When the fuel assembly is loaded in a reactor core, an upper core plate over the fuel assembly reacts against fuel assembly holddown spring assemblies attached by fasteners to the upper end fitting to provide a downward force. This force combines with the fuel assembly weight to prevent fuel assembly liftoff from hydraulic forces during operation of the reactor pumps.

BACKGROUND OF THE INVENTION

Debris in the circulating coolant which collects or is trapped in fuel rod spacer grids is believed responsible for as many as 70% of known fuel rod failures. Laboratory and in-reactor experience indicate that fuel rod cladding failures can be caused by debris trapped in a grid region which reacts against the fuel rod cladding in a vibratory fashion resulting in rapid wear of the cladding. The size and shape of the debris capable of causing severe damage is quite variable and may include broken fuel assembly fasteners or other holddown spring assembly broken parts. Accordingly, it is desirable to be able to operate safely without reconstitution even if a part of the assembly breaks. This can be accomplished by retention of any potential debris.

U.S. Pat. No. 5,053,191 describes an improved fuel assembly holddown cantilevered spring and it and U.S. Pat. No. 4,792,429 show how the spring ends were designed to provide spring capture and retention in the unlikely event that a cantilever spring broke during operation. However, machining of these patents' leaves and capturing mechanisms are expensive and time consuming.

SUMMARY OF THE INVENTION

It is, accordingly, an object of the present invention to modify the typical holddown spring assembly to eliminate the likelihood of debris from broken parts. This is accomplished by the use of a fuel assembly holddown leaf spring assembly instead of the typical cantilever spring of some commercial reactor designs. The holddown leaf spring assembly of the invention improves or duplicates the cantilever holddown spring characteristics while capturing both ends of the spring without elaborate capturing and retention mechanisms. In addition, the number of springs may be cut in half and machining costs reduced.

The novel fuel assembly holddown leaf spring assembly is constructed with similar materials as the prior art cantilever springs. The location of the top of the spring is in the opposite corner as compared to the cantilever design. This is due to the fact that the length of the leaf spring has to be longer than the cantilever and must be fit onto the top nozzle. The additional length requires the leaf spring to extend from near the top nozzle corner which accepts the upper core plate's fuel assembly aligning pins to the opposite aligning pin corner. The leaves themselves require only one hole being drilled at each end. The holes are used to secure the leaves to the upper end fitting. The use of welding plugs as described in Swedish patent application No. 9002638-6, filed Aug. 14, 1990, is more amenable to the design. However, the leaf spring could be designed to be held by spring screws, as in the prior art cantilevered spring design of U.S. Pat. Nos. 5,053,191 and 4,792,429.

The structure of the holddown leaf spring assembly with spring retention means of the invention for use on an upper end fitting of a nuclear fuel assembly includes a unitary elongated metal bar having two substantially tapered width leg portions joined by an arcuate transition portion therebetween adjacent the reduced width end of each of the tapered width leg portions. The wider and opposite end of each of the tapered width leg portions from the reduced width end and adjacent transition portion are adapted to be mounted to the fuel assembly end fitting by spring retention means. The spring retention means are pins welded within openings in the wider opposite ends of the leg portions and these wider opposite ends are adapted to be received and retained by the pins in spring retaining slots in the upper end fitting. The opposite ends are straight in order to facilitate their insertion into spring retaining slots in the upper end fitting. Alternatively, the spring retention means are screws within openings in the opposite ends and caps as shown in U.S. Pat. No. 4,792,429 and U.S. Pat. No. 5,053,191.

The novel structure of the instant invention prevents spring breakage and resultant debris by having an even stress distribution. This is created by the tapered width or cross-section. Moreover, with both ends of the leaf spring attached by retaining structure, in the event a spring breaks, there are no unrestrained loose parts to create debris.

The attachment of the leaf ends within slots in the upper end fitting also avoids bends at the leaf spring ends and permits use of only welded or staked spring holddown pins in spring leg end openings without caps and the complicated and expensive machining they require. Accordingly, the holddown leaf spring assembly of the invention is easier to manufacture and requires fewer parts than the prior art.

An added advantage is derived from the narrowing of the legs and the transition portion by the taper and elimination of retaining caps in that this structure opens the flow path of reactor coolant when coupled with a narrowing of the lower end fitting marginal lip or rim.

The effect of a linearly changing spring force by the tapering of the width in the illustrated embodiment is to distribute and reduce localized stresses in the metal bars as compared to an untapered bar. It is also possible to reduce localized stresses by tapering the bar thicknesses. The word "width", as used in the claims, applies both to horizontal width and vertical width or thickness, although, it is generally more expensive to taper the vertical "width" or thickness. The bars are of an INCONEL material typically used in prior art cantilevered springs.

PREFERRED EMBODIMENT OF THE INVENTION

Figure 1:
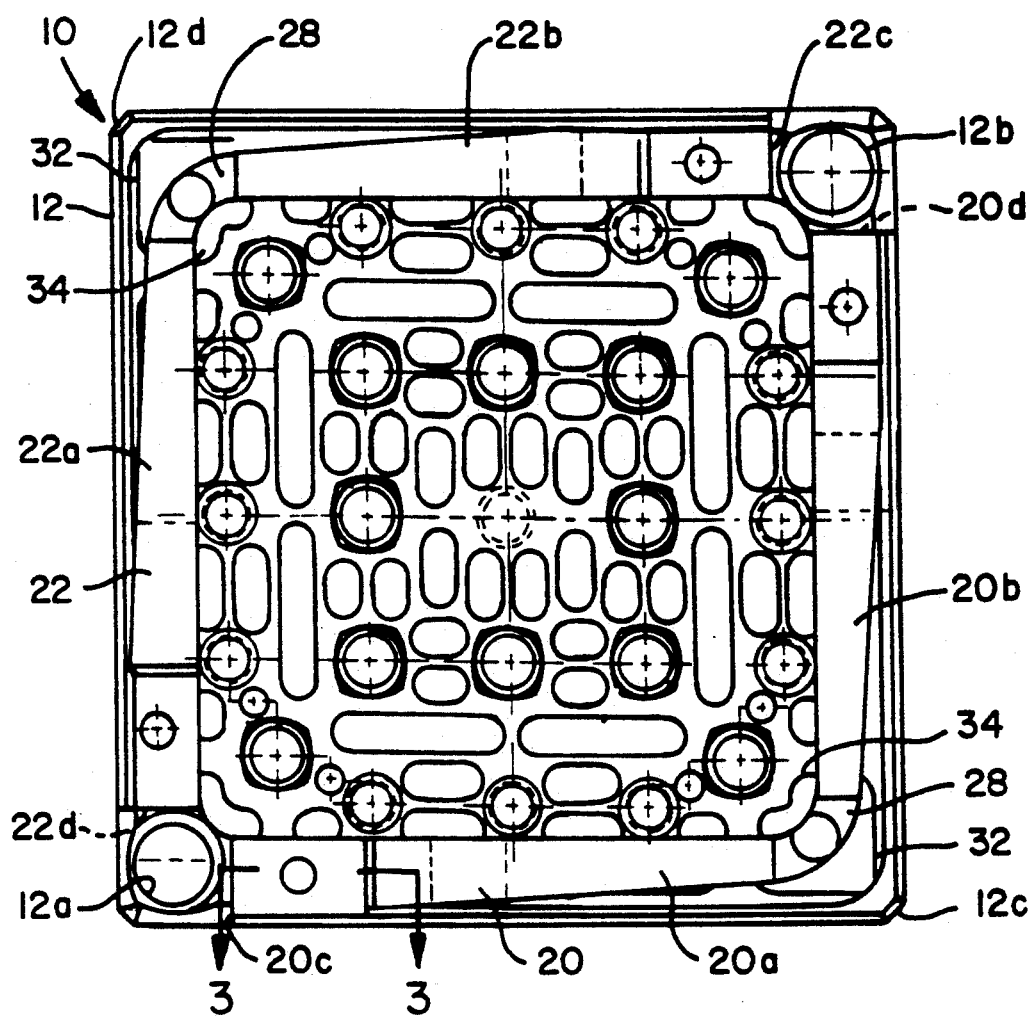
FIG. 1 is a plan view of a nuclear fuel assembly upper end fitting which includes a holddown leaf spring assembly according to the principals of the invention.
Figure 2:
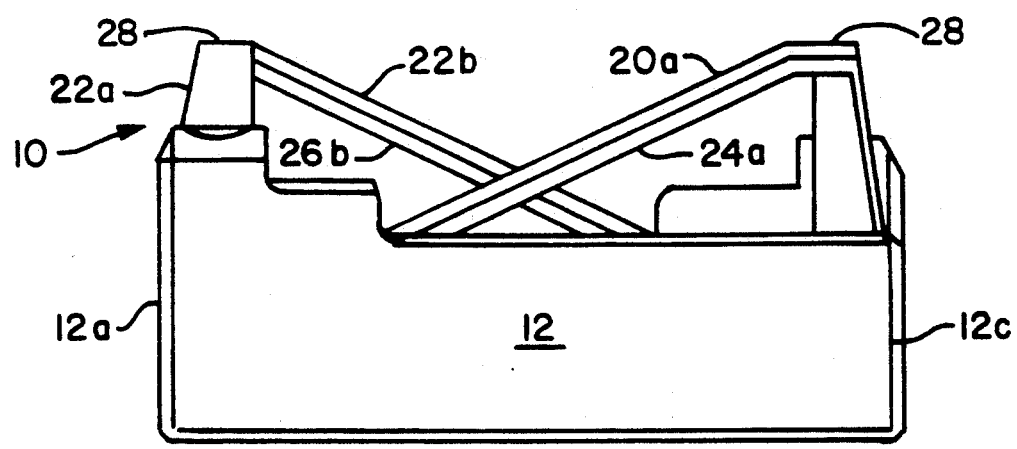
FIG. 2 is a side elevational view of the assembly of FIG. 1.

The numeral 10 generally designates a nuclear fuel assembly upper end fitting or top nozzle assembly which includes a holddown leaf spring assembly mounted thereon according to the principals of the invention. The upper end fitting 10 includes a top nozzle body weldment 12 of typical prior art design with certain modifications, as explained below, to accommodate the novel holddown leaf spring assembly of the invention.

The holddown leaf springs 20, 22, 24 and 26, each comprises a unitary elongated metal bar. The bars 20 and 22 are top bars in the embodiment shown and the bars 24 and 26 are lower bars. They make up two stacks of two unitary elongated metal bars 20, 24 and 22, 26, respectively, adapted to be mounted to the fuel assembly end fitting or top nozzle body weldment 12 to perform the spring function.

Each unitary elongated metal bar, 20, 22, 24, 26, has two substantially tapered width leg portions 20a, 20b, 22a, 22b, 24a, 24b, 26a and 26b, respectively. The tapered width leg portions of each bar are joined by an arcuate transition portion 28 therebetween adjacent the reduced width end of each of said width leg portions 20a, 20b, 22a, 22b, 24a, 24b, 26a, and 26b.

The wider opposite ends 20c, 20d, 22c, 22d, 24c, 24d, 26c, and 26d, respectively, of the unitary elongated metal bars 20, 22, 24 and 26 which make up the leaf springs of the assembly, are mounted to the fuel assembly top nozzle or end fitting 12 at angled slots 30 thereof. The slots 30 make the attachment of the leaf spring assembly to the end fitting 12 at only the corners adjacent the alignment pin openings 12a or 12b. The other opposite corners 12c and 12d of end fitting 12 below the transition areas 28 are spaced therefrom such that an improved flow path from the nozzle openings 32 and 34 upwardly is accomplished and no restricting lip, as was typically present in prior art designs, is required.

Figure 3:
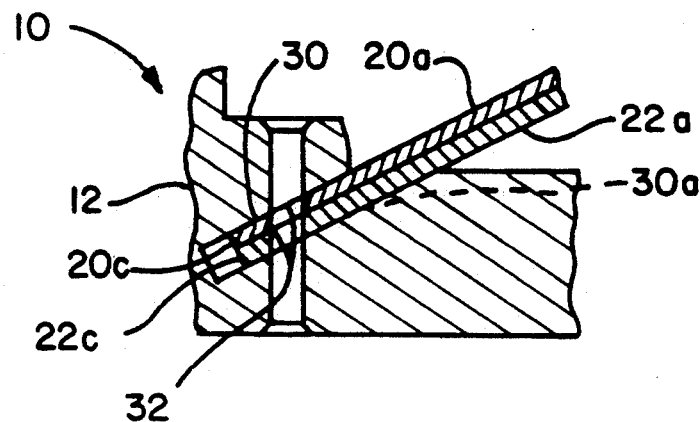
FIG. 3 is a cross-sectional view of the assembly of FIGS. 1 and 2 taken along the line 3—3 of FIG. 1.
Figure 4:
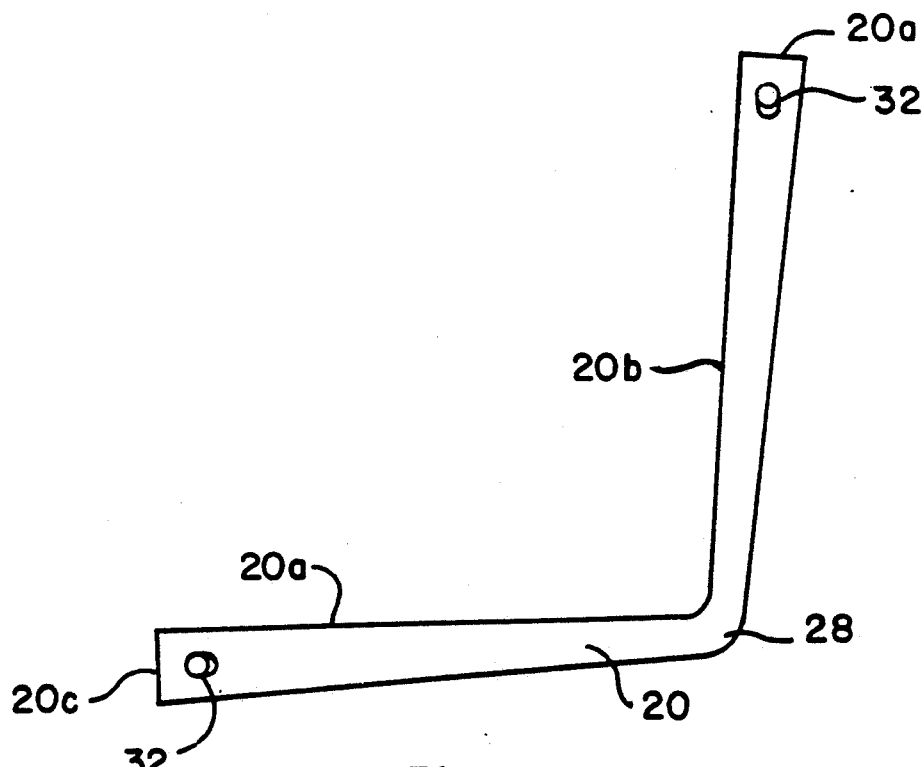
FIG. 4 is a plan view of a holddown leaf spring assembly unitary metal bar leaf spring.

The slots 30 are best illustrated in FIG. 3. It will be seen that they cooperate with the wide ends 20c and 22c to capture and retain the ends of leg portions 20a and 22a. To facilitate this spring retention, openings 32 are provided in the leg portions of the leaf springs. The openings 32 align with openings 34 in end fitting 12 and welded or staked pins (not shown) secured therein. Alternatively, spring retention means which are screws within openings 32 at the bar ends opposite the transition portion 28 may be used and capped as shown in U.S. Pat. Nos. 5,053,191 and 4,792,429, both of which are incorporated herein by reference, but this requires increased machining and a greater number of parts to accomplish the spring retention function.

The advantage of slot 30 is that the leg portions 20a and 22a, for example, may be made straight without the necessity of a localized stress inducing bend as was required by the typical prior art structures. To further reduce the possibility of a localized stressing, a contour as dotted in at 30a in FIG. 3 may be provided to avoid a sharp fulcrum and to thereby distribute any localized stressing as the spring stack of bars 20 and 22 flex.

Thus, it will be seen that a novel design of holddown leaf spring assembly is provided which: reduces the amount of machining required to produce the springs, eliminates the necessity of a spring cap, reduces machining of the top nozzle weldment, reduces the number of parts which make up the top nozzle assembly, increases the flow area of the top nozzle upper marginal region and requires only one bending operation per spring instead of two.

I claim:

1. A holddown leaf spring assembly for a nuclear fuel assembly with an upper end fitting, said leaf spring assembly including spring retention means and comprising, a unitary elongated metal bar leaf spring having two leg portions joined by an arcuate transition portion therebetween, said transition portion being spaced from the fuel assembly end fitting to provide an improved open flow path therebetween, the end of each of said leg portions opposite said transition portion is adapted to be mounted to the fuel assembly end fitting by leaf spring retention means.

2. The holddown leaf spring assembly of claim 1 in which the leg portions have a tapered width, the transition portion is adjacent the reduced width end of each of said tapered width leg portions and the wider opposite end of the tapered width leg portions from the reduced width end are adapted to be mounted to the fuel assembly end fitting by spring retention means.

3. The holddown leaf spring assembly of claim 2 in which the spring retention means are screws within openings in said opposite ends, and caps.

4. The holddown leaf spring assembly of claim 2 in which the spring retention means are pins within openings in said wider opposite ends and said wider opposite ends are received and retained by said pins in spring retaining slots in the upper end fitting.

5. The holddown leaf spring assembly of claim 4 in which said wider opposite ends are straight in order to facilitate their insertion into spring retaining slots in the upper end fitting.

6. The holddown leaf spring assembly of claim 2 in which two stacks of two unitary elongated metal bars make up the leaf springs of the assembly.

7. The holddown leaf spring assembly of claim 1 in which the (fuel assembly end fitting has nozzle openings adjacent its edge margins below) leaf spring bars have a shape which spaces the transition portions of the leaf spring bars (and spaced therefrom) away from any adjacent associated fuel assembly upper end fitting nozzle openings for an improved open flow path from the nozzle openings upwardly.

* * * * *